United States Patent Office 3,459,750
Patented Aug. 5, 1969

3,459,750
ASYMMETRICAL TRIAZINES
Goetz E. Hardtmann, Florham Park, N.J., assignor to Sandoz Inc., Hanover, N.J.
No Drawing. Filed Apr. 20, 1967, Ser. No. 632,204
Int. Cl. C07d 57/34, 55/10; A61k 27/00
U.S. Cl. 260—248                          3 Claims

ABSTRACT OF THE DISCLOSURE

The compounds are of the class of 6,7,8,9-tetrahydro-9aH-pyrido[1,2-d]as-triazines, which are substituted at the 1-position by methyl, ethyl, propyl or aryl and may be substituted at the 4-position by methyl or ethyl, e.g., 1-phenyl-6,7,8,9-tetrahydro-9aH - pyrido[1,2-d]as - triazine. The compounds and non-toxic pharmaceutically acceptable acid addition salts thereof are useful as central nervous system stimulants and as hypotensives. The compounds are prepared by reacting the hydrazone of a suitable 2-piperidyl ketone with a suitable carboxylic acid or ortho ester thereof.

This invention relates to asymmetrical triazines, and more particularly to 1-$R^1$-4-$R^2$-6,7,8,9-tetrahydro-9aH-pyrido[1,2-d]as-triazines of the formula

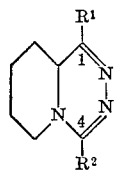

I non-toxic pharmaceutically acceptable acid addition salts thereof, intermediates in the preparation thereof and methods for preparing said triazines and intermediates thereof wherein:

$R^1$ is a member selected from the group consisting of linear alkyl having from 1 to 3 carbon atoms, i.e., methyl, ethyl and propyl, and aryl of the type of the formula

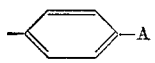

wherein:

A is a member selected from the group consisting of a hydrogen atom, chloro, linear alkyl having from 1 to 4 carbon atoms, e.g., methyl, ethyl, propyl and butyl, and linear alkoxy having from 1 to 4 carbon atoms, e.g., methoxy, ethoxy, propoxy and butoxy and;
$R^2$ is a member selected from the group consisting of a hydrogen atom, methyl and ethyl.

Compounds I are prepared according to the following reaction scheme A ($R^1$ and $R^2$ being as defined above and Q is a member selected from the group consisting of carboxyl and lower alkyl ortho ester, i.e., —C(O alkyl)$_3$ wherein the alkyl is linear and has from 1 to 6 carbon atoms):

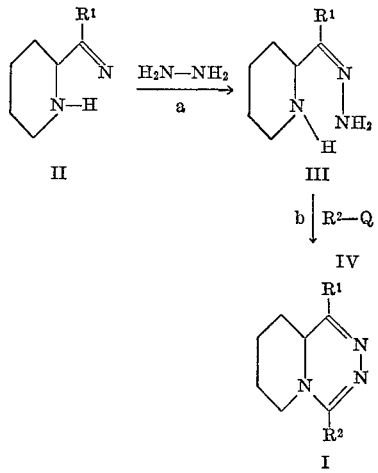

According to reaction scheme A, step $a$ is effected by reacting a compound II, i.e., a 2-piperidyl-$R^1$-ketone, with hydrazine, preferably anhydrous hydrazine, to obtain the corresponding compound III. The reaction is effected at temperatures of from 60° to 115° preferably by refluxing at atmospheric pressure. The reaction may be carried out in an excess of the hydrazine whereby the hydrazine acts as a solvent, or in a suitable solvent, e.g., xylene. Compounds III form acid addition salts, e.g., with HCl, and such salts are prepared and converted to free compounds III by conventional methods.

Step $b$ is effected by reacting the compound III with $R^2$—Q (compound IV), i.e., an $R^2$-containing carboxylic acid or ortho ester thereof, to obtain the corresponding compound I, at from 50° to 150° preferably at reflux. The reaction may be carried out in an excess of $R^2$—Q or in a suitable solvent, e.g., xylene. Where an ortho ester is used as compound IV, it may be advantageous to add a catalytic amount of an acid catalyst, e.g., p-toluene sulfonic acid.

Compounds II are either known or may be obtained by methods suitable for the preparation of known analogs, such as the procedure of reaction scheme B which follows ($R^1$ being as defined above):

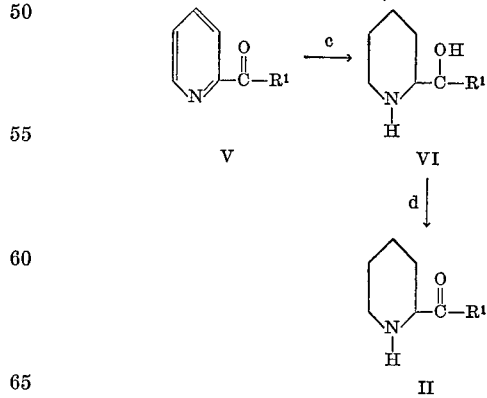

According to reaction scheme B, step c is a reduction of a 2-acrylpyridine, i.e., a compound V, to the corresponding compound VI, in a hydrogen atmosphere, with agitation, in the presence of a hydrogenation catalyst, e.g., $PtO_2$. Where $R^1$ is a moiety which is susceptible to hydrogenation, e.g., phenyl, the saturation of the pyrido moiety, without concomitant saturation of the $R^1$ moiety, may be accomplished by adjustment and selection of hydrogenation conditions, as is well-known in the art, e.g., by the use of low catalyst to substrate proportions, low hydrogen pressures, e.g., up to 10 atmospheres, and moderate temperatures, e.g., under 100°.

Step d is an oxidation of compound VI to the corresponding compound II. The oxidation may be effected by the use of well-known methods for the oxidation of a carbinol to the corresponding ketone, e.g., by the use of chromium trioxide in acetic acid at 15° to 30°, preferably with initial cooling of the reaction mixture (10° to 20°).

Compounds I are useful because they have pharmaceutical activity. They are useful as central nervous system stimulants. In addition they are useful as hypotensives. They are administered to mammals either orally or parenterally in daily doses of from 1 to 5 mg./kg. of body weight, e.g., for most mammals from 60 to 300 milligrams per diem, preferably administered in doses of from 15 to 150 milligrams; a single daily oral does is also acceptable.

For the above uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate, benzenesulfonate and the like.

For example, each of the pharmaceutically active compounds of this invention may be incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; and average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

| | Parts |
|---|---|
| Title compound of the example | 60 |
| Tragacanth | 2 |
| Lactose | 29.5 |
| Corn starch | 5 |
| Talcum | 3 |
| Magnesium stearate | 0.5 |
| Alcohol SD–30 } Purified water } | q.s. |

An example illustrative of this invention follows. Throughout this disclosure all temperatures are centigrade (room temperature is 20°) and all percents and parts are by weight, unless specified otherwise. Parts by weight are related to parts by volume as a kilogram is related to a liter.

1-phenyl-6,7,8,9-tetrahydro-9aH-pyrido[1,2-d]as-triazine

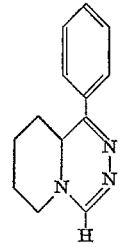

This example illustrate the preparation of a compound I according to the reaction schemes described above.

(a) 2-(α-hydroxybenzyl)piperidine:

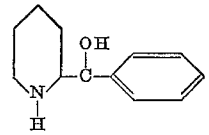

Dissolve 50 parts of 2-benzoyl-pyridine in 100 parts by volume of glacial acetic acid, add 1 part of platinum oxide and shake the mixture in a hydrogen atmosphere (5 atmospheres pressure) at room temperature for 24 hours. Remove the glacial acetic acid by evaporation under vacuum to obtain a residue. Dissolve the residue in 400 parts by volume of dilute hydrochloric acid (5%) and neutralize with 50% aqueous sodium hydroxide. Extract the neutralized mixture twice with 250 parts by volume portions of chloroform. Combine the chloroform extracts and wash with water, dry over sodium sulfate and evaporate under vacuum. Crystallize the residue from ethanol to obtain compound (a) melting point, (M.P.) 132° to 134°.

(b) Phenyl 2-piperidyl ketone:

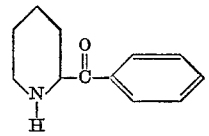

Dissolve 32 parts of compound (a), i.e., 2-(α-hydroxybenzyl)piperidine, in 160 parts by volume of glacial acetic acid. Cool the solution to 15°, with stirring, and add thereto 13.2 parts of chromium trioxide in small portions over a period of 1 hours. Allow the reaction mixture to stand at room temperature for 18 hours, then concentrate to 70 parts by volume by evaporating under vacuum. Add the concentrated mixture to 150 parts by volume of water and adjust to pH 9 to 10 by addition of ammonium hydroxide solution (28%). Extract thrice with 200 parts by volume portions of diethyl ether, combine the extracts, wash with water, dry over sodium sulfate and evaporate under vacuum to obtain a residue. Crystallize from diethyl ether to obtain compound (b), M.P. 97° to 100°.

(c) 2-piperidyl phenyl ketone hydrazone:

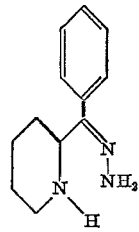

Dissolve 18 parts of compound (b) in 200 parts by volume of anhydrous hydrazine and reflux the mixture for 80 hours. Remove the unreacted hydrazine by evaporating, under vacuum, dissolve the residue in chloroform, then evaporate under vacuum to obtain an oily residue. Dissolve the oily residue in 100 parts by volume of methanol, saturate the solution with hydrogen chloride and allow to stand at 10° C. Recover the hydrochloride of compound (c), as fine needle-shaped crystals which separate from the solution, melting point (M.P.) 227° to 231°.

Dissolve the hydrochloride salt of compound (c), in water, alkalize, extract with chloroform and evaporate the extract under vacuum to recover compound (c), as the free base.

(d) 1 - phenyl-6,7,8,9-tetrahydro-9aH-pyridol[1,2-a]as-triazine.—Dissolve 8.3 parts of compound (c), in 150 parts by volume of 98 to 100% formic acid and reflux the mixture for 3 hours. Cool the mixture to room temperature, add 150 parts by volume of water and neutralize (with cooling) with 50% sodium hydroxide aqueous solution. Extract the mixture thrice with 200 parts by volume portions of chloroform, wash the combined extract with 200 parts by volume of water, dry over sodium sulfate and evaporate under vacuum to obtain crude title compound as a residue, which then crystallizes from 50 parts by volume of ethanol-ether to obtain the purified title compound, M.P. 129° to 133°.

Following the procedure described in this example but replacing the formic acid with an equivalent amount of propionic acid results in the preparation of the corresponding compound I, i.e. 4-ethyl-1-phenyl-6,7,8,9-tetrahydro-9aH-pyrido[1,2-d]as triazine. Similarly, replacing the phenyl 2-piperidyl ketone with an equivalent of ethyl 2-piperidyl ketone results in the preparation of the corresponding compound I, i.e. 1-ethyl-6,7,8,9-tetrahydro-9aH-pyrido[1,2-d] as triazine.

What is claimed is:
1. A compound which is a member selected from the group consisting of a triazine of the formula

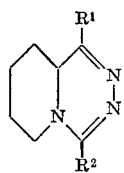

and a non-toxic pharmaceutically acceptable acid addition salt of said triazine wherein:

$R^1$ is a member selected from the group consisting of linear alkyl having from 1 to 3 carbon atoms and aryl of the formula

wherein:

A is a member selected from the group cosisting of a hydrogen atom, chloro, linear alkyl having from 1 to 4 carbon atoms, and linear alkoxy having from 1 to 4 carbon atoms; and $R^2$ is a member selected from the group consisting of a hydrogen atom, methyl and ethyl.

2. A compound according to claim 1 in which $R^2$ is hydrogen and R' is aryl of the formula:

wherein A is defined in claim 1.

3. The compound which is 1-phenyl-6,7,8,9-tetrahydro-9aH-pyrido[1,2-d]as-triazine.

References Cited

UNITED STATES PATENTS 3,007,927   11/1961   Liberman _____ 260—248 XR

HENRY R. JILES, Primary Examiner

J. M. FORD, Assistant Examiner

U.S. Cl. X.R.

260—293, 294; 424—249